Patented Jan. 24, 1950

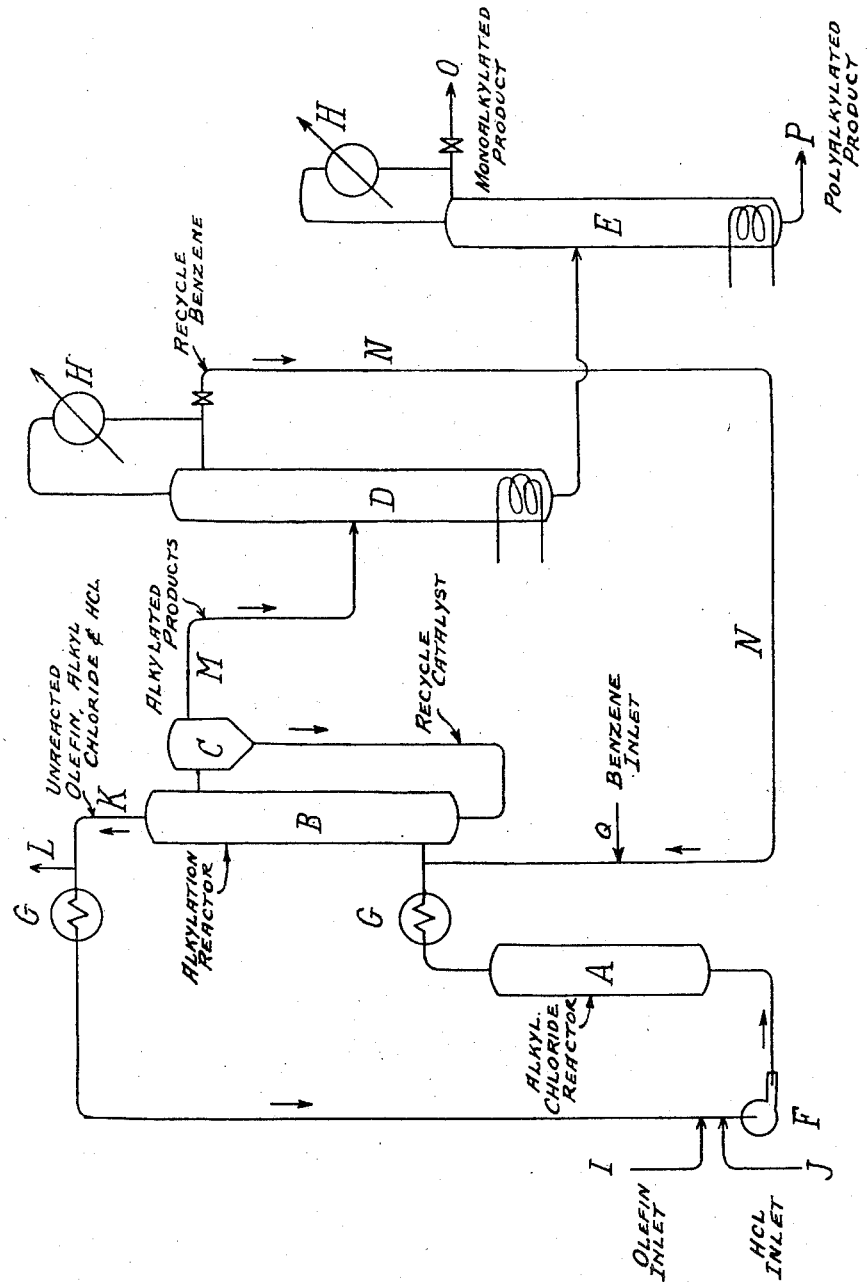

2,495,323

UNITED STATES PATENT OFFICE 2,495,323

ALKYLATION PROCESS

André Gislon, Paris, France, assignor to Compagnie Francaise de Raffinage (Societe Anonyme), Paris, France Application June 12, 1946, Serial No. 676,339
In France November 17, 1942

Section 1, Public Law 690, August 8, 1946
Patent expires November 17, 1962

2 Claims. (Cl. 260—671)

It is known that the alkylation of an aromatic hydrocarbon, such as benzene, can be effected by means of an olefine, such as ethylene, in the presence of a catalyst which is suitable for Friedel and Crafts' reactions, such as aluminum chloride. But such alkylation is slow and difficult to produce, this being all the more so as the aromatic in question is heavier (i. e. contains a larger number of benzenic nuclei), and as it is desired to fix on each nucleus a larger number of alkyl radicals. Although the operation is comparatively easy to effect with benzene, it proves very difficult, for instance with products obtained by condensation and polymerisation of aliphatic chains and of benzene hydrocarbons, such as those produced by the condensation of benzene and/or of its homologues with dichloro-ethane.

Alkylation takes place much more quickly if the operation is carried out with an alkyl chloride for instance ethyl chloride; in that case it takes place with an elimination of hydrochloric acid.

However, the use of an alkyl chloride has a double drawback which substantially increases the cost of the final product: on the one hand, it is necessary to prepare and separate the alkyl chloride by one of the known methods; on the other hand, the hydrochloric acid which is evolved during the alkylation cannot generally be used if the manufacture of the alkyl chloride cannot be annexed to that of the alkylated aromatic product.

It is the object of the present invention to obviate the various drawbacks explained above by producing a cycle in which only an olefine (or optionally a mixture of olefines) and the aromatic to be alkylated are introduced, and from which only the alkylated aromatic is taken out, while benefiting by the advantages inherent in alkylation by means of an alkyl chloride.

The characteristic cycle of the invention comprises two phases:

In the first phase, a current of equal volumes of olefine, for instance of ethylene, and of gaseous hydrochloric acid is passed through a catalysis chamber, at a temperature which depends on the nature of the catalyst. Such catalyst may, for instance, be: either a metallic chloride dissolved in an appropriate liquid, or a metallic chloride on a support, or aluminum chips. In a general manner, any known adequate catalytic method may be used. At the issue of the catalysis chamber, a mixture is collected which is composed, on the one hand of ethyl chloride, on the other hand of unaltered ethylene and hydrochloric acid.

It should be noted that this first phase differs essentially from the known manufacture of ethyl chloride by the action of hydrochloric acid on ethylene (more generally of an alkyl chloride, by the action of hydrochloric acid on the corresponding olefine) by the fact that it is not required to obtain as high a rate of transformation as possible. As the speed of the reaction decreases proportionally to the alkyl chloride concentration according to an exponential function, a considerable time is gained by only effecting a partial reaction, which gain has a very advantageous repercussion on the cost of manufacture and enables the size of the plant to be reduced.

In the second phase, the mixture obtained from the first phase, after being cooled to the temperature suitable for the alkylation hereinafter, is conveyed to the alkylation apparatus where it acts on the aromatic to be alkylated, in the presence of the suitable quantity of a catalyst suited to Friedel and Crafts' reactions, for instance of aluminum chloride. Therefore all the plant and all the expense involved in the separation of alkyl chloride are thus avoided.

The ethyl chloride fixes itself on the aromatic with the formation and elimination of hydrochloric acid, and the outgoing gaseous mixture, which contains this hydrochloric acid and also the ethylene which has not reacted in the first phase, and possibly traces of ethyl chloride, is heated to the normal temperature and fed back to the head of the first phase, i. e. to the inlet of the catalysis chamber, where a fresh quantity of ethylene is introduced and where the cycle begins again. At the same time a quantity of hydrochloric acid which is exactly necessary to compensate the inevitable losses is introduced.

In this second phase, a more or less considerable portion of the olefine can react, owing to the presence of an excess of hydrochloric acid, and such reaction is more efficient as the olefine is soluble in the aromatic. Owing to this fact, an economy is effected in the recycling, which has an advantageous repercussion on the capacity of production of the plant.

Of course, the heating of the mixture before the first phase, i. e. at the entrance of the catalysis chamber, and the cooling after the first phase, i. e. at the outlet of said chamber, are effected for the greater part by a heat exchanger between the outgoing and the incoming gases.

In this cycle, the ethylene and the hydrochloric acid which is intended to compensate the losses are introduced continuously, whereas the introduction of the aromatic to be alkylated may be effected, either continuously, or discontinuously, as well as the extraction of the alkylated product.

The application of the combination of phases which forms the present invention will be all the more advantageous as olefines are used which react slowly by direct alkylation, i. e. ethylene and the first homologues of the series. Naturally, the hydrochloric acid may be replaced by another hydrohalogen acid.

The accompanying drawing is a diagrammatic flow sheet representing one example of the application of the process of the present invention.

On this drawing A designates the catalytic chamber in which the first phase is accomplished. This chamber A is fed with olefine by piping I and with HCl by the piping J. A circulating pump may be provided for moving the gases as indicated at F.

The alkylation apparatus utilized for the second phase is shown at B in series with two heat exchangers G. K designates a recycle connection for unreacted gas. C designates a separator for the alkylation catalyst. D is a column for separating (through the recycle connection N) the unreacted hydrocarbon, and E is a column for separating (through the outlet connection O) the monoalkylated product. A diagrammatic symbol designated H represent condensers. L represents a purging connection and M the the connection for conducting the alkylated product from the separator C to the column D. P designates the connection for drawing off the polyalkylated products.

In the use of this apparatus the hydrochloric acid gas is supplied through the connection J and ethylene gas is supplied through connection I in amount sufficient when added to recycle gas returning through the connection K, to feed the acid and the olefine gas at equal volumetric rates. This mixture passes through the catalytic chamber A in the first phase of the treatment, and the mixture coming from this catalytic chamber is composed in part of ethyl chloride and in part of unaltered ethylene and hydrochloric acid. This mixture is cooled in the heat exchanger G and passed on to the alkylation tower B, which is supplied with an aromatic hydrocarbon, e. g. benzene, in the presence of a Friedel-Crafts catalyst; for example, aluminum chloride. The benzene is introduced through a pipe Q into the pipe N and flows therethrough to the reactor B.

From the top of the alkylation column B, gases pass off through the recycle line K, which are composed essentially of the hydrochloric acid formed in the alkylation reaction, together with any unreacted hydrochloric acid and ethylene and small amounts of ethyl chloride which are left after the reaction with benzene. These gases pass through the heat exchanger G where they are brought to a temperature appropriate for return to the first phase reaction chamber A.

The alkylated product is drawn off from the tower B in liquid form to the separator C where the catalyst is decanted from the liquid product and returned to the alkylation tower B while the liquid product flows through the connection M to the separating column D. This, as indicated diagrammatically by the coil at its lower end, is heated sufficiently to vaporize the unreacted benzene which then passes off with or without condensation through the recycle line N. The liquid product remaining from the treatment in D passes on to the column E where it is further heated by the coil diagrammatically indicated at its base, to a temperature at which the monoalkylated product is separated and drawn off with or without condensation at H through the outlet O. Polyalkylated products are discharged through P.

As will be well understood, the apparatus used throughout, as well as the methods of separation, of heating, cooling, and moving the gases and liquids through the apparatus, are conventional, and may be as preferred by the engineers designing any particular plant.

I claim:

1. A process for alkylating a mono-cyclic aromatic hydrocarbon with an olefin which comprises the steps of feeding an olefin and hydrochloric acid gas to a first reaction zone containing a metal chloride catalyst, causing said olefin to be only partially converted into an alkyl chloride in said first reaction zone to produce a mixture containing substantial amounts of both said olefin and said alkyl chloride, passing the resulting unseparated mixture of olefin, alkyl chloride and hydrochloric acid gas to a second reaction zone, bringing a mono-cyclic aromatic hydrocarbon into contact with said mixture in said second reaction zone in the presence of a Friedel and Crafts catalyst to cause said aromatic compound to be alkylated by said alkyl chloride and at least a portion of the olefin in said mixture, recycling unreacted olefin and hydrochloric acid gas from said second reaction zone to said first reaction zone, and withdrawing from said second zone a reaction product containing said alkylated aromatic compounds.

2. A process for alkylating a mono-cyclic aromatic hydrocarbon with an olefin which comprises the steps of feeding an olefin and hydrochloric acid gas to a first reaction zone containing a metal chloride catalyst, causing said olefin to be only partially converted into an alkyl chloride in said first reaction zone to produce a mixture containing substantial amounts of both said olefin and said alkyl chloride, passing the resulting unseparated mixture of olefin, alkyl chloride and hydrochloric acid gas to a second reaction zone, bringing a mono-cyclic aromatic hydrocarbon into contact with said mixture in said second reaction zone in the presence of a Friedel and Crafts catalyst to cause said aromatic compound to be alkylated by said alkyl chloride and at least a portion of the olefin in said mixture, and withdrawing from said second reaction zone unreacted olefin and hydrochloric acid gas and a reaction product containing said alkylated aromatic compounds.

ANDRÉ GISLON.

REFERENCES CITED

The following references are of record in the file of this patent:

UNITED STATES PATENTS

| Number | Name | Date |
|---|---|---|
| 1,591,151 | Wibaut | July 6, 1926 |
| 1,995,827 | Thomas | Mar. 26, 1935 |
| 2,001,907 | Ipatieff | May 21, 1935 |
| 2,198,595 | Amos et al. | Apr. 30, 1940 |
| 2,360,547 | Chenicek | Oct. 17, 1944 |
| 2,366,716 | Frey | Jan. 9, 1945 |